(12) United States Patent
Schlarb

(10) Patent No.: US 6,802,077 B1
(45) Date of Patent: Oct. 5, 2004

(54) METHOD FOR A PAY-PER-VIEW REFERRAL

(75) Inventor: John M. Schlarb, Alpharetta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/501,882

(22) Filed: Feb. 10, 2000

Related U.S. Application Data

(63) Continuation-in-part of application No. 09/303,285, filed on Apr. 30, 1999
(60) Provisional application No. 60/083,893, filed on May 1, 1998.

(51) Int. Cl.⁷ .......................... H04N 7/173; H04N 7/16; H04N 5/445; G06F 3/00; G06F 13/00
(52) U.S. Cl. .............................. 725/104; 725/2; 725/4; 725/5; 725/8; 725/37; 725/38; 725/61; 725/134; 725/142
(58) Field of Search .......................... 725/104, 61, 1–8, 725/37–59, 134, 142; 723/87, 101

(56) References Cited

U.S. PATENT DOCUMENTS

| | | | | |
|---|---|---|---|---|
| 5,317,391 A | * | 5/1994 | Banker et al. | 725/139 |
| 5,329,590 A | * | 7/1994 | Pond | 380/242 |
| 5,592,551 A | * | 1/1997 | Lett et al. | 380/211 |
| 5,734,853 A | * | 3/1998 | Hendricks et al. | 345/716 |
| 5,751,282 A | | 5/1998 | Girard et al. | |
| 5,822,123 A | * | 10/1998 | Davis et al. | 725/43 |
| 5,850,218 A | * | 12/1998 | LaJoie et al. | 725/45 |
| 6,341,374 B2 | * | 1/2002 | Schein et al. | 725/43 |

* cited by examiner

Primary Examiner—John Miller
Assistant Examiner—Michael W. Hoye

(57) ABSTRACT

A method for a PPV referral that provides to a subscriber the time, date, and channel of the next showing of a PPV event if the subscriber tries to purchase the PPV event after the purchase window is closed for the current showing. The subscriber is provided information on the next showing of the PPV event regardless of when or on which channel the next showing occurs. In addition, a method and system for providing a single multipurpose PPV channel that a subscriber tunes for all PPV services. There can be a single multipurpose PPV channel for all PPV services or single PPV channels for groups of similar services, such as a Family PPV channel. Each represents a single multipurpose channel of similar programming. Once a subscriber purchases a PPV event, the HCT tunes to the MPEG transport stream and program information for the selected PPV event and displays the PPV event on the single multipurpose PPV channel at its associated start time. The subscriber does not have to select another channel. The subscriber that has not purchased a current PPV event continues to watch the previews, advertising, or program guide uninterrupted on the single multipurpose PPV channel. If a subscriber is watching the single multipurpose PPV channel and has not purchased a PPV event, the subscriber continues to see advertising with video or previews even between the event specific advertising. An interstitial service provides the previews, advertising, or PPV guide during the period between PPV event advertisements.

8 Claims, 9 Drawing Sheets

METHOD FOR A PAY-PER-VIEW REFERRAL

RELATED PATENT APPLICATION

The present application claims priority to U.S. Provisional Application No. 60/083,893, Schlarb et al., Method and Apparatus for Pay-Per-View System, filed May 1, 1998 and is a continuation-in-part of U.S. application Ser. No. 09/303, 285, Schlarb et al., Method and Apparatus for Pay-Per-View System, filed Apr. 30, 1999.

FIELD OF THE INVENTION

This present invention relates to a system of providing pay-per-view services in a subscriber television system and, more specifically, to providing interstitial video pay-per-view services and pay-per-view referrals in subscriber television systems.

BACKGROUND OF THE INVENTION

The current methods of providing Pay-Per-View (PPV) services include a PPV program channel and a couple of separate event channels for showing the PPV events. The PPV program channel provides advertising of future PPV events, video previews, and can include a PPV program guide that lists the PPV programs, the show times of the programs, and a description of each program. A PPV event ("Movie A" at 6:00 PM) is a specific showing of a PPV program ("Movie A"). The PPV events are shown on the event channels; i.e., the subscriber tunes to a separate event channel to watch a purchased PPV event. Subscribers purchase a PPV event from the PPV program channel or, in some systems, from the event channel where the PPV event will be shown. A PPV event is transmitted to a Home Communications Terminal (HCT) at a subscriber location in the event channel signal during the show time of the PPV event. Only a subscriber that has purchased the PPV event can view it. Other subscribers will see a scrambled signal if they tune to the event channel associated with the PPV event. If a subscriber tunes to the wrong channel after purchasing a PPV event, the subscriber will miss the PPV event until the subscriber tunes to the correct channel.

The digitizing of broadband signals now allows a subscriber television system to offer thousands of channels, of which hundreds can be PPV channels. PPV channels produce revenue for a subscriber television system. To maintain subscriber satisfaction and revenue, there is need for the PPV channels and PPV guide to respond to subscriber input with a minimum of delay. The PPV event data must be retrieved as it is used and may change at any time. With hundreds of PPV channels, the PPV event database becomes too large to be stored in most HCTs, must be split into multiple files to avoid exceeding bandwidth-related file size limitations, and requires an efficient sort mechanism to minimize delays in accessing the information.

Because a subscriber has thousands of channels to choose from, the operators of subscriber television systems are increasingly interested in using advertising to keep a subscriber's attention on the PPV channel events when the subscriber is not watching a PPV event. If a subscriber's attention drifts, the subscriber may select something else to watch and not preview and purchase PPV events. In addition to advertising on the PPV program channel, advertising is currently also done on the event channels. The advertising on an event channel can include video, typically. During the showing of a PPV event on an event channel, for subscribers not purchasing the PPV event, text only advertising or tuning information (i.e. Tune to Channel 50 for "Movie A" show times) is displayed as a text barker. The barker is transmitted in the Vertical Blanking Interval (VBI) associated with the event channel. The size of the VBI limits the information to text only.

Current methods of advertising on PPV systems include an advertising window that opens an hour before the start of a PPV event and closes 15 minutes after the start of the PPV event. There can be long periods, even hours, after the close of one advertising window before the opening of the advertising window for the next PPV event. During this time a static text barker is often displayed. The gap between advertising windows helps to minimize subscriber confusion associated with advertising "Movie B" during "Movie A" and a subscriber trying to buy "Movie A" and actually purchasing "Movie B". In addition, after a PPV event is no longer available for purchase, current PPV system methods indicate to the subscriber that the next showing of the PPV event will be immediately following the current showing of the PPV event or refer the subscriber to a program guide for the next showing of the PPV event.

Thus, there is a need for a PPV system in which the Pay-Per-View service is easy for a subscriber to use, in which a subscriber that does not purchase a PPV event can be shown advertising with video, in which advertising can be shown between advertising windows in a way that does not cause subscriber confusion, and in which the required PPV service and event information is transmitted to the HCT efficiently in order to minimize the amount of information that must be transmitted over the network, the memory required for storage in the HCT, and the amount of time required to access the information from the network by the HCT. In addition, there is a need for a PPV system that directs a subscriber to the next showing of the PPV event regardless of the time or channel associated with the next showing.

DETAILED DESCRIPTION

Figure 1:
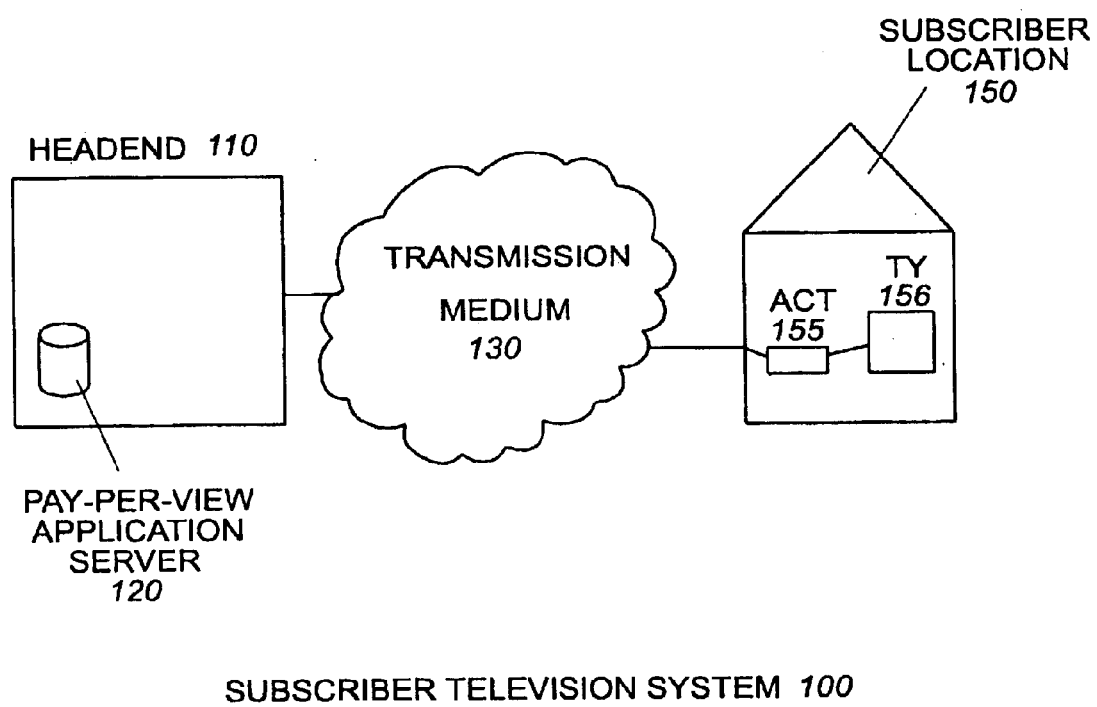
FIG. 1 is an overview of a Subscriber Television System.

The present invention provides a single, multipurpose Pay-Per-View channel for all PPV services, provides advertising during PPV events to subscribers that have not purchased a current PPV event, provides general interstitial advertising between advertising windows, provides an efficient method of organizing the PPV event database for efficient access in response to subscriber input, and provides a method to direct a subscriber to the next showing of the PPV event regardless of the time or channel associated with the next showing.

In an embodiment, the present invention provides a single, multipurpose PPV channel that a subscriber tunes to for all PPV services. From the subscriber's perspective, the program guide, previews, advertising, purchasing options, and showings of all PPV events occur on a single channel. There can be a single multipurpose PPV channel for all PPV services or single PPV channels for groups of similar services, such as a single Family PPV channel, a single Sports PPV channel, and a single Adult PPV channel that each represent single multipurpose channels for similar programming. The advertising on a single multipurpose channel can be directed to the type of programming on all the channels in the group. Once a subscriber purchases a PPV event, the HCT tunes to the MPEG transport stream and program information for the selected PPV event and displays the PPV event on the single, multipurpose PPV channel at its associated start time. The subscriber does not have to select another channel. The subscriber that has not purchased a current PPV event continues to watch the previews, advertising, or program guide without interruption on the single, multipurpose PPV channel. If a subscriber is watching the single, multipurpose PPV channel and has not purchased a PPV event, the subscriber continues to see advertising with video or previews even between the event specific advertising.

In addition, the PPV event database is organized to maximize the efficiency of providing information based on different types of subscriber input. Accessing an immediate file provides all the information describing what is currently showing and what will be showing next. From a PPV guide if a program showing the next day looks interesting and a subscriber wants to know when it will start, a service file is accessed. If the subscriber wants to know more about a future movie before purchasing it, a related advanced file is accessed to provide a description of the program, a rating, and other non event information associated with the program.

In another embodiment, the present invention provides a PPV referral to direct a subscriber to the next showing of the PPV event regardless of the time or channel associated with the next showing. The PPV referral displays the time, the channel, and other program information, such as cost or ratings, for the next showing of the PPV event that the subscriber can no longer purchase. In addition, the subscriber is given an opportunity to buy the indicated next showing on the same display that includes the other information about the next showing of the PPV event. This is intended to provide a simple and easy process to elicit a PPV purchase from a subscriber that has indicated an interest in purchasing a PPV event but has missed the purchase window for the current showing. The subscriber is provided directly with information on the PPV event they missed and a simple way to purchase the next showing. The system operator has an increased opportunity for additional revenue from the purchase of the next showing of the PPV event.

The present invention is best understood within the context of a subscriber television system. Referring now to the drawings, in which like numerals represent like elements throughout the several figures, a subscriber television system and an exemplary embodiment of the present invention will be described.

FIG. 1 is an overview of a subscriber television system 100, which offers Pay-Per-View services to its subscribers. In the subscriber television system 100, a headend 110 receives and organizes input programming and information for distribution to the subscriber locations 150 via a transmission medium 130, such as a two-way digital hybrid fiber-coax (HFC) network. A Pay-Per-View (PPV) application server 120 in the headend 100 provides the programming for the PPV services. A PPV client program module on Home Communications Terminal (HCT) 155 interfaces between the subscriber inputs and the PPV services to be displayed on a display device, such as television 156.

Figure 11:
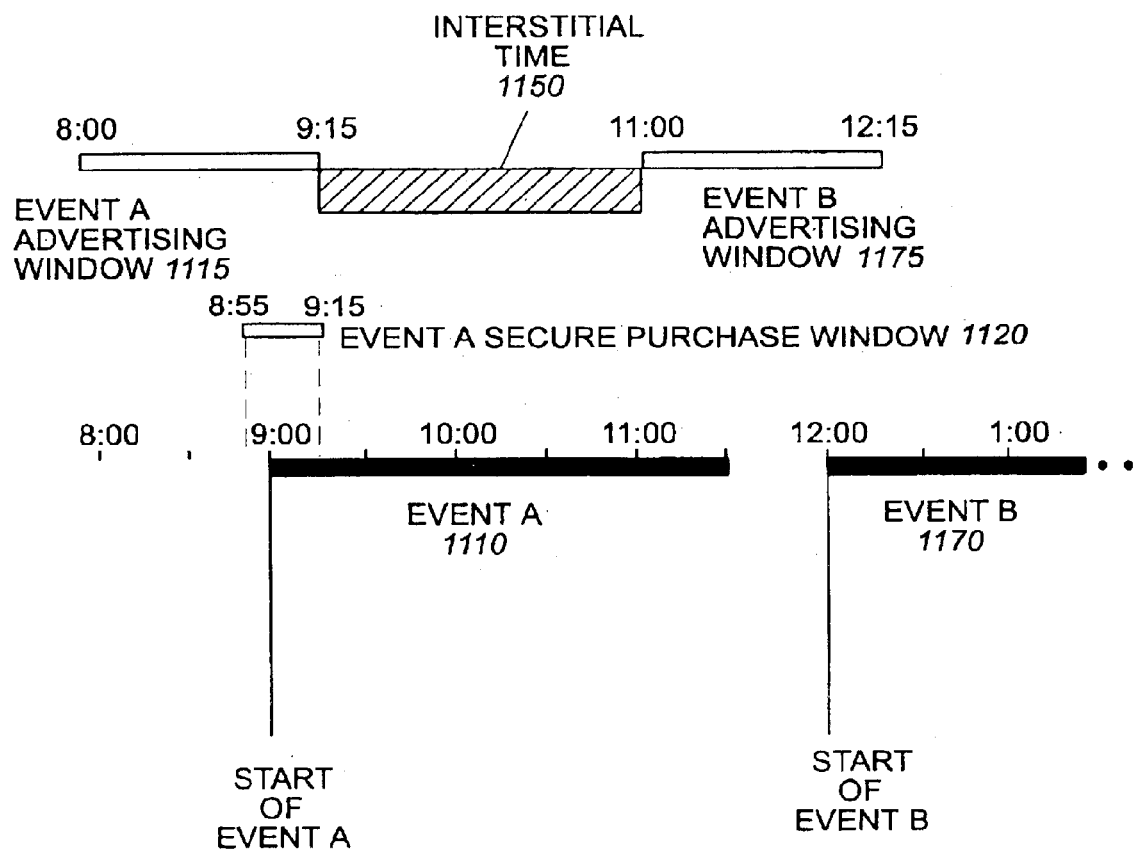
FIG. 11 illustrates a time line for advertising, purchasing, and displaying PPV events.

Before continuing, it is helpful to discuss FIG. 11 and the temporal relationships between various activities associated with a PPV service. FIG. 11 illustrates a time line for advertising, purchasing, and displaying PPV events. The display of PPV event A 1110 starts at 9:00 and ends at 11:30. The secure purchase window 1120 for PPV event A 1110 is open from 8:55 to 9:15. Any purchase of PPV event A 1110 prior to 8:55 is stored and activated after 8:55. The event A advertising window 1115 opens at 8:00 and closes at 9:15 when the purchase window 1120 closes. The display of PPV event B 1170 starts at 12:00. The event B advertising window opens at 11:00. The interstitial time 1150, in this example, is from the close of the event A advertising window 1115 at 9:15 until the opening of the event B advertising window at 11:00.

One feature of the present invention is that it provides advertising with video during the interstitial time 1150. The interstitial advertising includes general advertising that is differentiated from the advertising for a particular event. The interstitial advertising can include a wide variety of different types of advertising, such as advertising related to the theme of the PPV service or advertising for products or services, such as a card dealership, that are completely unrelated to PPV services.

Figure 12:
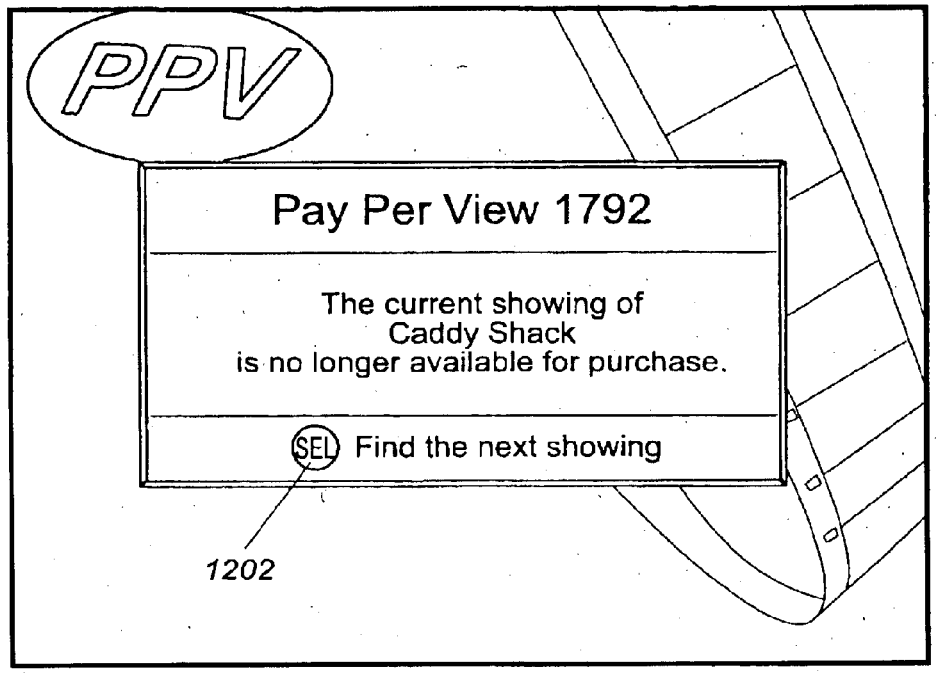
FIG. 12 illustrates a PPV window that indicates the PPV event is no longer available for purchase.
Figure 13:
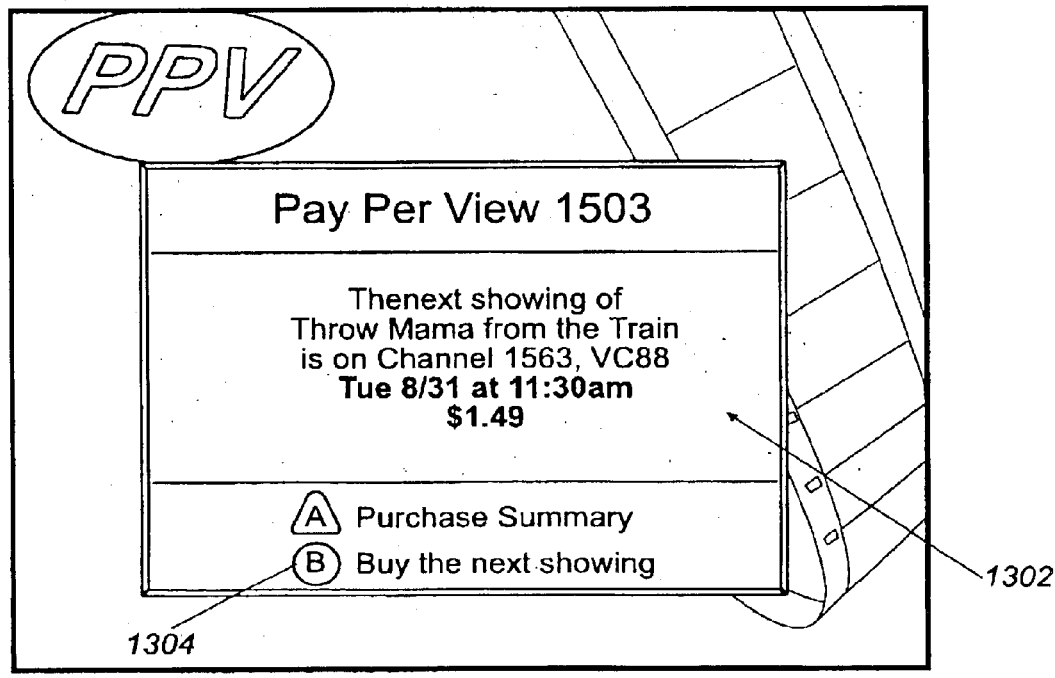
FIG. 13 illustrates a PPV Referral window with program information for the next showing of the PPV event.

Another feature of the present invention is the PPV referral. A subscriber that misses the event A purchase window 1120 can be shown a PPV referral for the next showing of event A, rather than be immediately shown advertising for event B or other PPV information. FIG. 12 illustrates a PPV window that indicates the PPV event is no longer available for purchase. The subscriber can press the Select button on a remote control, as indicated by icon 1202, to access the PPV referral window. FIG. 13 illustrates a PPV Referral window with program information for the next showing of the PPV event. The PPV referral displays the time, the channel and other program information for the next showing of the PPV event that the subscriber can no longer purchase in Program Information Block 1302. In addition, the subscriber is given an opportunity to immediately buy the indicated next showing. The Buy Icon 1304 provides a visual clue to the subscriber to press the B button on a remote control to purchase the PPV event.

Figure 2:
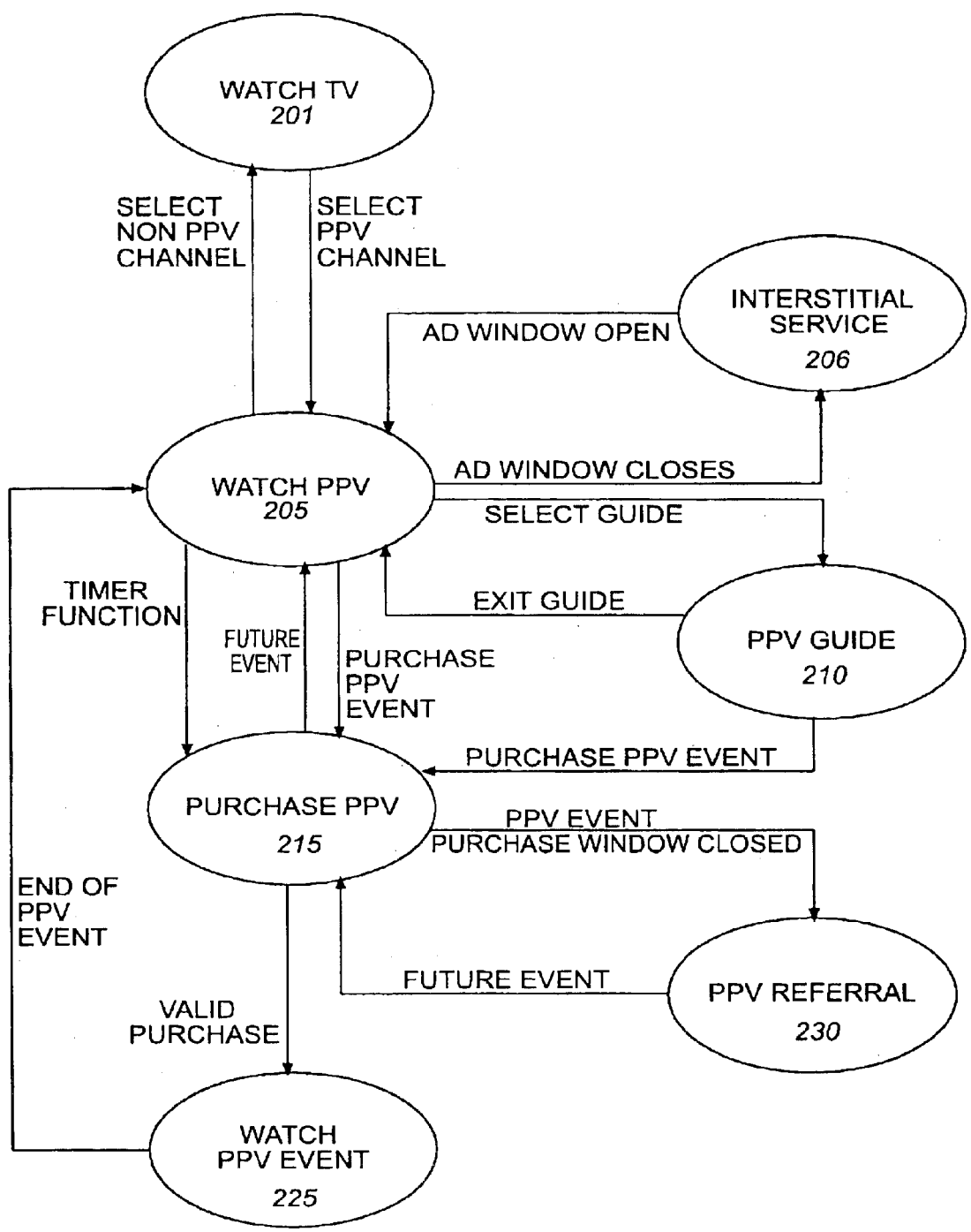
FIG. 2 is a state diagram that illustrates a method for tuning to multiple PPV services on a single channel.

FIG. 2 is a state diagram that illustrates a method for tuning to multiple PPV services on a single channel. In the initial state, Watch TV state 201, a subscriber is watching a non PPV channel. The Watch TV program module on HCT 155 controls the functions associated with the subscriber watching television. When a subscriber selects a PPV channel in the Watch TV state 201, the method transitions to the Watch PPV state 205.

In the Watch PPV state 205, the Watch PPV program module coordinates the display of information on the single, multipurpose PPV channel that was selected by the subscriber. From the subscriber's perspective, the program guide, previews, advertising, purchasing options, and showings of all PPV events occur on a single channel. The PPV events may be organized into several services or PPV channels for guide display, but the programming is displayed on the single PPV channel. The Watch PPV program module coordinates the display of the PPV guide, the previews, advertising, and the purchase options. The Watch PPV program module includes a variety of functions, such as a purchase barker, a preview barker, an event advertisement window, and a countdown function. From the Watch PPV state 205, the method can transition to any of several states depending on the events that occur.

When the advertising window for the current PPV event ends, the method proceeds to the Interstitial Service state 206. Interstitial advertising is displayed in this state. The method returns to Watch PPV state 205 when the advertising window for the next PPV event opens.

Referring again to the Watch PPV state 205, when a subscriber selects a guide option in the Watch PPV state 205, the method transitions to the PPV guide state 210. The subscriber can navigate the PPV guide and purchase a PPV event from the PPV guide. When the subscriber chooses to exit the PPV Guide state 210, the method returns to the Watch PPV state 205.

A subscriber, depending on the subscriber television system 100 and the PPV applications functioning on the system, can purchase a PPV event in several ways, such as from a purchase barker displayed by Watch PPV or from the PPV guide. The selection of a purchase option from the PPV Guide state 210 or the Watch PPV state 205 results in the method transitioning to the Purchase PPV Event state 215. The validation of the purchase and the determination of the status of the PPV event to be purchased is determined in the Purchase PPV Event state 215. If the purchase is for a future PPV event, a timer is set for the time when the purchase window for the future PPV event will open, the purchase information is stored, and the method returns to the Watch PPV state 205. The actual secure purchase occurs just before the actual PPV event, but does not require any additional input from the subscriber. The method transitions from the Watch PPV state 205 back to the Purchase PPV Event state 215 when the timer indicates the purchase window is open. When the purchase window for a PPV event is open a secure purchase is made either with the stored information from a previous purchase or directly with subscriber input. With a valid purchase, the method transitions from the Purchase PPV Event state 215 to the Watch PPV Event state 225. In the Watch PPV Event state 225, a Watch TV application is activated, which coordinates the actual display of the PPV event. The subscriber does not have to select another channel. The HCT 155 tunes to the MPEG transport stream and program information for the selected PPV event and displays the PPV event on the single subscriber PPV channel. At the end of the PPV event, the method transitions back to the Watch PPV state 205. The subscriber that has not purchased a PPV event continues to watch the previews or advertising uninterrupted on the single PPV channel from the Watch PPV state 205. When the subscriber selects a non-PPV channel the method transitions back to the Watch TV state 201.

If a subscriber has attempted to purchase a PPV event for which the purchase window is closed from the Watch PPV state 205, the Purchase PPV Event state 215 can refer the subscriber to the PPV Referral state 230. The subscriber is then provided with the information about the next showing of the selected event without having to return to the PPV Guide state 210. The PPV referral can display the information about the next showing of the PPV event in a variety of ways such as in a banner or a barker. The subscriber can also indicate a desire to purchase the next showing of the PPV event and the method transitions back to the Purchase PPV Event state 215.

The PPV data for hundreds of PPV channels can be very large if it includes program descriptions, ratings, other related information, and start times for several days for each program. The PPV database files are organized into multiple file types, including Immediate files, Guide files, Index files, Service files, and Advanced files, to provide efficient access in response to specific subscriber input. Each PPV program is typically shown multiple times. Each showing will have its start time and other associated parameters associated with the specific showing, such as cost. The information specific to a particular showing comprises the PPV event. This organization allows multiple PPV events to reference a program file. The primary sort order for Advanced PPV data files is by program record, then by PPV event start time. PPV events are accessed by service identification and start time (or entitlement identification) or by program title and start time. Accessing a PPV event by service identification and start time (or entitlement identification) requires two operations, one to get a handle for the PPV event and a second to read the PPV event information from an advanced file, based on the handle. The handle is a pointer to indicate where additional information associated with a PPV event is located in an advanced file.

Several of the PPV files (index, services, advance, and guide files) are interdependent. Each of these files includes a version number, which is incremented whenever the index, services, advance, or guide file is updated. For any multiple-file operation, the PPV client must ensure that the version number is consistent for each file, and restart the operation if the version does change. When a PPV event is modified (e.g., extended or deleted) by the PPV server 120, all files, which include the PPV event, are updated at the same time. The passthrough message for the change is not sent until all of the files reflect the new PPV event data.

The Immediate file provides information for the next two PPV events on each service for a quick and immediate response to subscriber input. The Immediate file contains two events, current and next, for each service with all available information for each event. If no event is active (i.e., there is a gap between the previous and next events), this file will include the currently advertised event and the next advertised event. The Watch PPV application uses immediate files to coordinate the multiple functions associated with the advertising and previews. Each PPV service is capable of advertising only one event at a time. This fact is exploited to speed up the PPV client user interface. Upcoming events (those which are currently advertised or active on each PPV service) are sent in the Immediate file. Because this Immediate file is small, it may be included in a carousel frequently. The carousel describes how frequently a file is available to be read in the transport stream from the headend and how large the file can be. This allows the purchase barker for an upcoming event to be available more quickly (i.e. included in the carousel more frequently) than the purchase prompt for a future event. The PPV server updates the Immediate file each time a PPV event ends, to remove the expired PPV event, and add the next PPV event.

The Guide file provides program titles and a handle into the Advanced file for additional information about each program. The Guide file is an alphanumerically sorted listing of all program titles and associated show times. The Guide file is small enough that it can be cached in DRAM, so that there is no User Interface (UI) latency while the subscriber scrolls through the list of available PPV programs. The PPV server will update the Guide file whenever new PPV programs are added, or when the file version number changes.

The Index file provides relatively static information for each PVV service and contains a global text heap. The global text heap includes standard text strings, such as "$3.99", "1-800-BUY-PPV2", and other frequently used text. The PPV applications can refer to the small table offset associated with each text string and do not have to refer to the entire text. For example, an application refers to table offset 01 rather than referring to "1-800-BUY-PPV2". The PPV server 120 updates index when a PPV service is added or deleted, or when the distribution of the services in the service file changes. The Index file is also updated when its version number changes.

Figure 3:
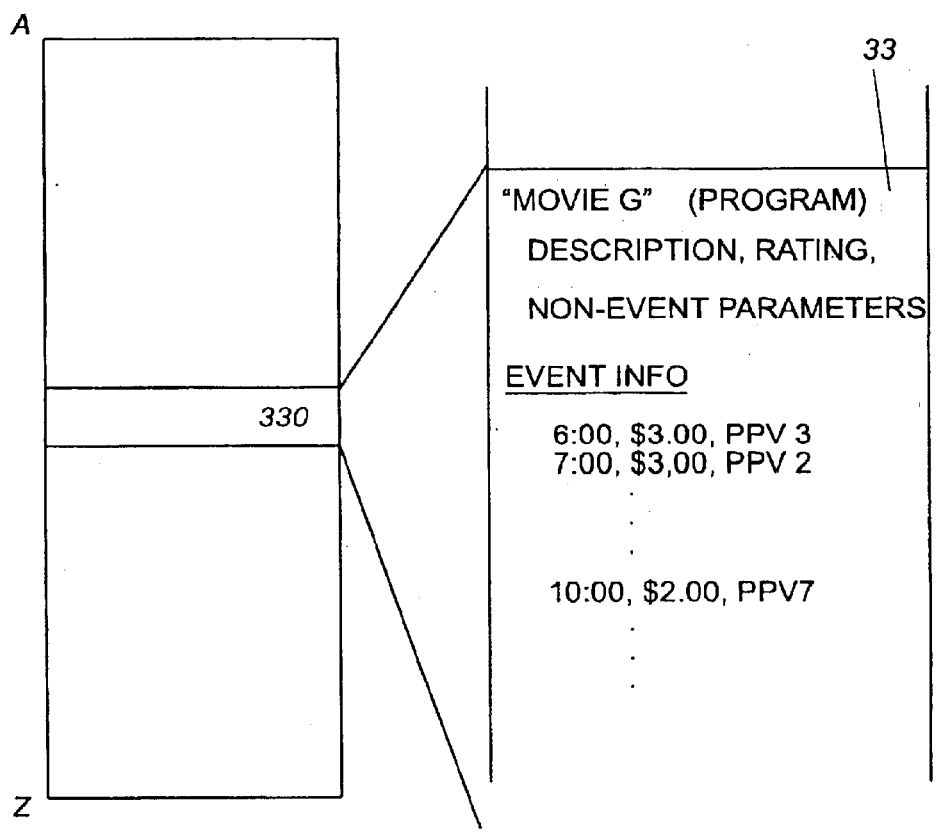
FIG. 3 is a graphical depiction of an Advanced file.

FIG. 3 is a graphical depiction of an Advanced file 320. The Advanced file 320 contains all of the PPV programs and events known to the PPV server, several days or even weeks in advance. The PPV client in HCT 155 uses the Advanced file 320 for browsing PPV event information, for purchasing PPV events, to restore PPV event information if the HCT 155 loses power. The Advanced file 320 is organized into program records, which are sorted alphanumerically, such as from A to Z. Each program record 330 contains a PPV Program title and a list of PPV Events for that program, sorted by start time. If this data is too large to be sent in one file, the PPV server divides the Advanced file 320 into multiple files. Each divided file includes a base index indicating the first program record in the file.

Figure 4:
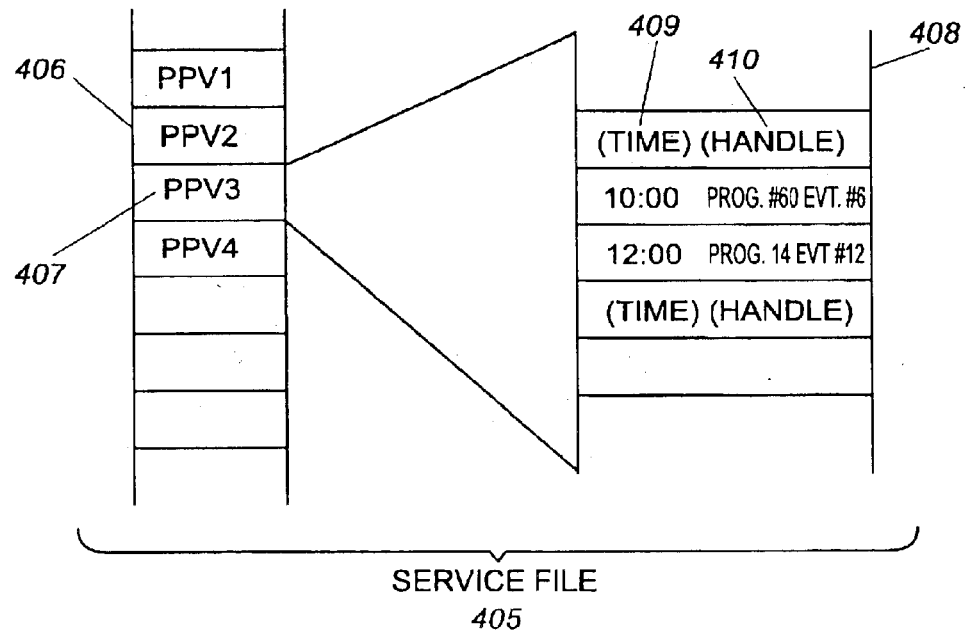
FIG. 4 is a graphical depiction of a Service file.

FIG. 4 is a graphical depiction of a Service file 405. The Service file 405 is organized by services 406, such as the PPV1, PPV2, etc. listings on a PPV guide. For each separate service 407 there is a listing 408 of every start time 409 and an associated handle 410. One skilled in the art will appreciate that the function of the Service file 405 is to provide more information than an Immediate file, yet without all the information of an Advanced file 320, and in a format to allow quick access and a handle to the additional information in an Advanced file 320. The Service file 405 can contain entitlement identification (EID), start time 409, length, and a handle 410 for every PPV event, by service. If a PPV event must be located by its service index and start time 409 (or service index and EID), the Service file is used to look up the handle 410 of the PPV event. This handle 410 provides enough information to locate the PPV event/program data in the Advanced file 320. This reduces the time spent searching the Advanced file 320 for information and allows the event or program information to be loaded into memory on the HCT 155 without having to load the entire advanced file.

The PPV server updates the Service file 305 and the Advanced file 320 at least once per day, to remove expired programs and events. Additionally, updates can occur at any time to add new programs and events, or modify existing events. These files are updated at the same time, so that any new program/event indices are valid.

Figure 5:
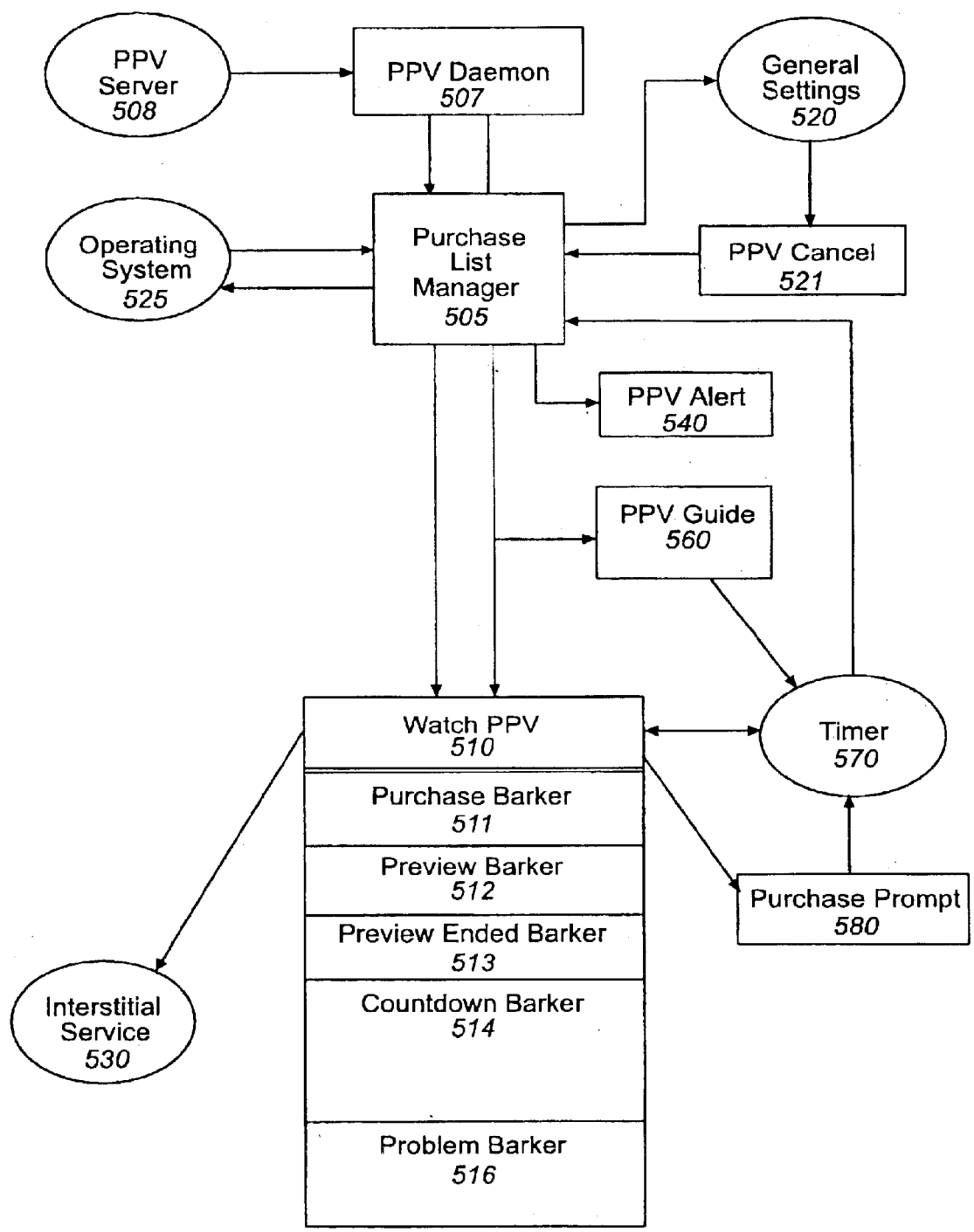
FIG. 5 is an overview of program modules that support a single, multipurpose PPV channel.

FIG. 5 is an overview of program modules that support a single, multipurpose PPV channel. A method for providing communications between the program modules is provided by a Service Activation Manager (SAM), which is described in U.S. patent application Ser. No. 09/071,550, Jerding et al., System and Method for Providing a Plurality of Programming Services in a Television System, filed May 1, 1998 and U.S. patent application Ser. No. 08/802,833, Defreese et al., System and Method for Providing a Full Service Television System, filed Feb. 19, 1997, both of which are incorporated herein by reference.

A Purchase List Manager (PLM) program module 505 maintains a single list for all PPV purchases. The PLM 505 also provides Application Programming Interfaces (APIs) to generate lists for a General Settings program module 520, including Pending Events (cancelable PPV events, composed of both advance and secure purchases), Past Events (no longer cancelable PPV events which have started), and Pre-Purchased Events (PPV events which haven't started yet). The Purchase List Manager 505 has no user interface (UI) component, and exists mainly to provide a centralized interface between the PPV client and other entities. The PLM 505 is responsible for maintaining the Purchase List with all relevant data for each PPV event, reconstructing the Purchase List following an HCT 155 power loss, providing Purchase and Cancel APIs which insulate other components from knowledge of whether the purchase is an advance or a secure purchase, managing the state of each PPV event in the list (cancelable, immediate cancelable, secure-purchased, etc.), canceling a PPV event if the purchase window closes and it has not been authorized or has a status problem, and if a purchase is changed or removed (either by the server or the user), notifying other applications, as appropriate.

A PPV Daemon program module 507 is the interface to the PPV server 508. The PPV Daemon 507 accepts PPV passthrough messages from the PPV server 508 and notifies Watch PPV application 510 and the General Settings program module 520 if a pending PPV event is modified or deleted. The PPV Daemon 507 has no UI component. The PPV Daemon 507 retrieves PPV event and program data, allocates memory for the retrieved information, insulates the rest of the PPV Client from updates when possible, and organizes concurrent PPV requests.

An operating system 525 includes the purchase manager, performs secure purchases of PPV events when a purchase window opens, and maintains the appropriate purchase status (okay or failed) for the PPV events.

A General Settings program module 520 generates event lists in chronological order (by start time) and activate the cancel purchase process, which displays a warning before allowing the viewer to cancel a PPV event from the PPV Cancel program module 521.

A Watch PPV program module 510 is analogous to the Watch TV application. The Watch PPV module 510 is activated when a subscriber selects a PPV service through the SAM. The Watch PPV module 510 maintains the state of the current PPV event, presents the barker or service that is associated with the state of the current PPV event, gets the next PPV event when the current PPV event is no longer current, and activates the Purchase Prompt when a timer is set for a PPV channel. The Watch PPV program module 510 coordinates the purchase barker 511, preview barker 512, preview end barker 513, countdown barker 514, no event barker 515, and the problem barker 516. The Watch PPV program module 510 interfaces to the Watch TV application, the PLM 505, Interstitial service module 530, Timers 570, and Purchase Prompt module 580.

The purchase barker program module 511 displays a purchase barker when the advertised event is not purchased, and no preview is active. The purchase barker shows the information about the PPV event, such as the title, description, cost, and running time of the event.

The preview barker program module 512 displays a preview barker when the advertised event is not purchased, and the event is pre-viewable. The preview barker shows the same information as the purchase barker.

The preview ended barker program module 513 displays a preview ended barker if the advertised event is not purchased when the preview window closes. Its purpose is to alert the subscriber that the preview has ended, and that the subscriber is missing the PPV event (now in progress). If the preview window closes while the Preview Barker is displayed, the Preview Ended Barker is shown.

The countdown barker program module 514 displays a countdown barker when the advertised event has been purchased, but is not yet pre-viewable or active. The countdown barker shows information about the PPV event, such as the title, description, start, and end time for the PPV event.

The problem barker program module 516 displays a problem barker when the advertised event has been purchased, but there is a problem with the purchase. The problem barker can describe the problem and provide a customer service telephone number to call.

The interstitial service program module 530 is activated if there is no active or advertisement for the selected PPV service. The interstitial service continues until the advertising window opens for the next PPV event.

The PPV alert program module 540 is activated by the Purchase List Manager 505 before, and at the start of a PPV event.

The PPV guide program module 560 provides a user-interface to the PPV event information. A PPV purchase can be performed from some PPV guide applications.

The timer program module 570 performs multiple functions within a PPV system, such as timing Watch PPV functions, PPV guide functions, and PPV purchase functions.

The Purchase prompt program module 580 prompts the subscriber to purchase a current or future PPV event. The Purchase prompt creates a list of all marketable PPV events, removes from this list any PPV events which have already been purchased or which are no available to the particular subscriber or which do not have open purchase windows. The Purchase prompt module 580 interfaces with the timers 570 and the Watch PPV application 510.

A single multipurpose pay-per-view subscriber channel must be able to provide the normal functions associated with PPV services, such as allowing the subscriber to purchase and advance purchase a PPV event, cancel a purchase, have the purchase authorized, prompt the subscriber to purchase a PPV event, and to securely authorize any purchases.

A PPV event can be purchased from a purchase program module that is part of a PPV guide program module, part of the Watch PPV program module, or through other methods. The purchase program module of the present invention allows advanced purchase of future PPV events, even without a PPV guide program module. A subscriber can, all within a Watch PPV program module, select a PPV event from an advertisement or other listing, select a start time, and purchase the PPV event. The PPV event is stored until the authorization or secure purchase window opens and the actual purchase is authorized. No additional input is required from the subscriber in the advanced purchase process after the initial purchase.

Figure 6:
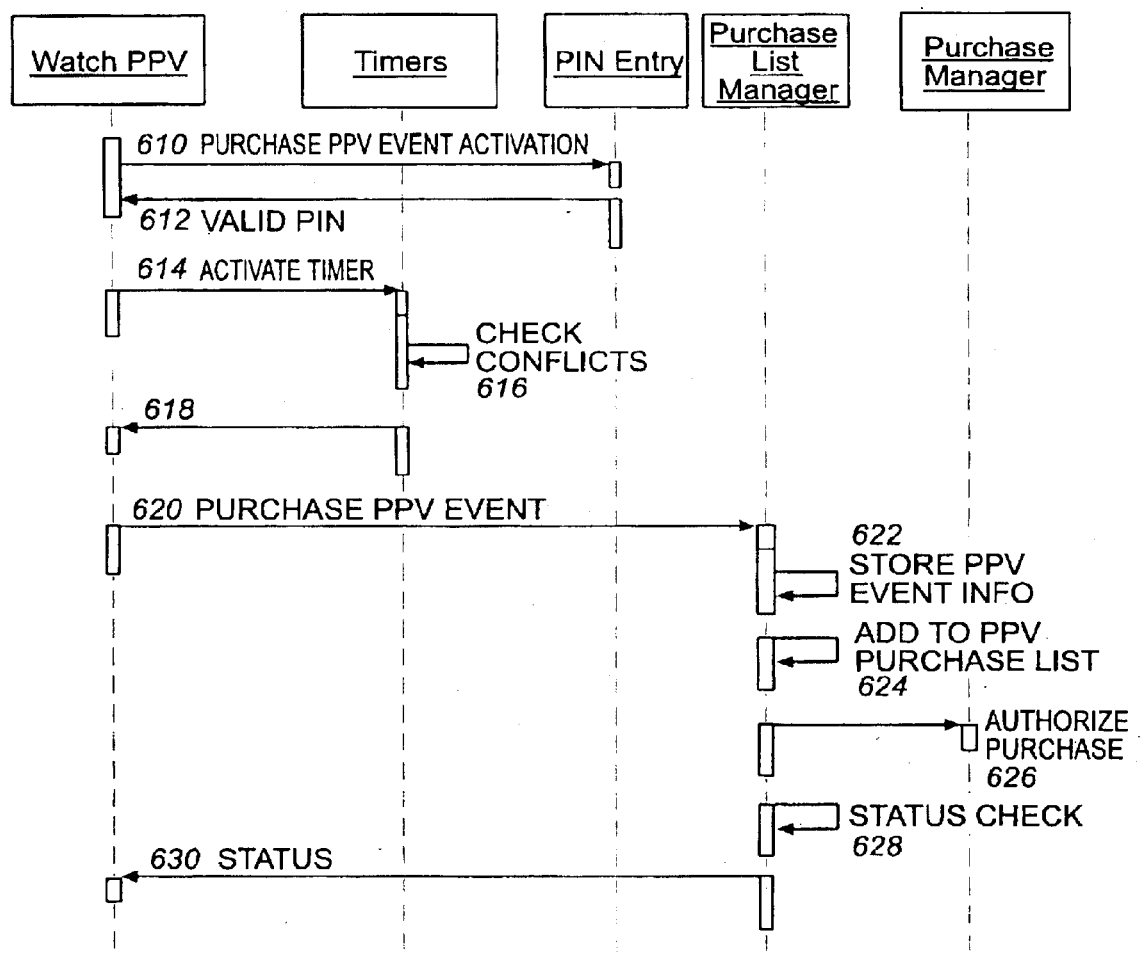
FIG. 6 illustrates an exemplary method for purchasing a PPV event.

FIG. 6 illustrates an exemplary method for purchasing a PPV event. In step 610, a purchase program module associated with the Watch PPV program module would receive an activation message from the Watch PPV program module. The Watch PPV activation message indicates a subscriber input, such as a response to a purchase barker, purchase window, or a purchase button on an advertisement. The purchase input often includes a personal identification number (PIN) to verify the subscriber's authorization of the purchase. If a PIN was included in the activation message the PIN is verified. After verification, in step 612, a valid PIN message is returned to the Watch PPV program module. In step 614, the Watch PPV program module activates a timer program module associated with purchasing a PPV event. In step 616, the timer program module verifies that there are no conflicts or problems with the purchase timing, such as a previous purchase for the same or an overlapping time. If the timer program module responds with an indication of conflicts, the purchase is stopped and the Watch PPV program module informs the subscriber. If there are no conflicts, in step 618 the timer function responds to the Watch PPV program module with a successful indication. In step 620, the Watch PPV program module sends a purchase PPV event command to a purchase list manager program module. The purchase list manager coordinates the purchase and authorization of the purchase using several steps. In step 622, the purchase list manager coordinates the storing of the purchase information. In step 624, the purchase list manager coordinates adding the PPV event to the list of purchases. At the appropriate time, in step 626, the purchase list manager coordinates authorizing the purchase with the purchase manager program module. The authorization window is typically opened shortly before the start of a PPV event. If the authorization window is not open, the purchase remains pending until the authorization window is opened. This pending status allows future purchasing of PPV events. Once the purchase is authorized, in step 628, the status of the PPV event is checked and, in step 630, a status message is provided to the Watch PPV program module.

Figure 7:
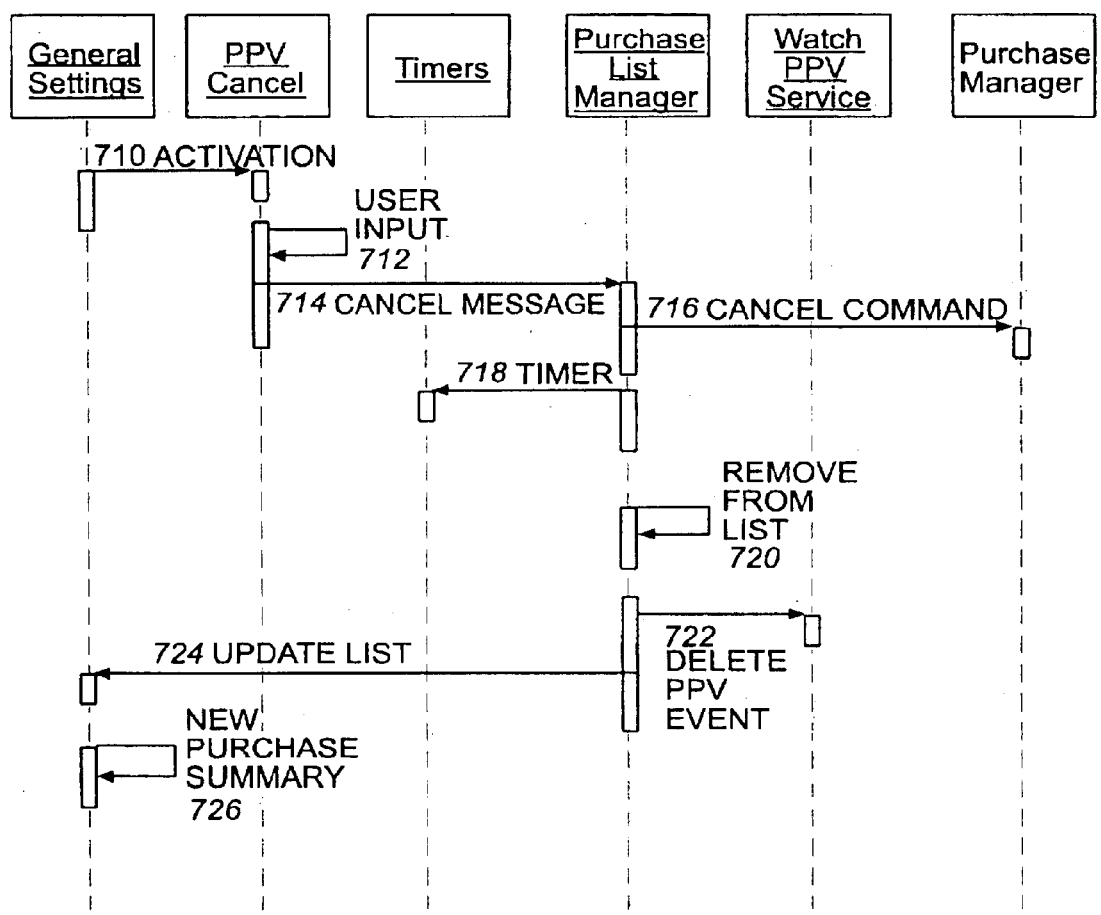
FIG. 7 illustrates a method for canceling a purchase.

FIG. 7 illustrates a method for canceling a purchase. Subscriber input activates a cancel purchase in the general settings program module. In step 710, the general settings program module activates a cancel PPV purchase program module. In step 712, the subscriber validates the cancel command. The cancel program module communicates with the purchase list manager to cancel the purchase at step 714. If the PPV event to be canceled is still a future event, step 716 is skipped. If the PPV event is a current event and was authorized, the purchase list manager communicates with the purchase manager to cancel the purchase at step 716. If the communication to the purchase manager to cancel the PPV event is unsuccessful, the purchase is not canceled. If it is successful, the purchase list manager coordinates the other functions associated with canceling the purchase, such as stopping the timer function (step 718), removing the canceled PPV event from the purchased list (step 720), and deleting the canceled PPV event in the Watch PPV application (step 722). The updated list is communicated to the general settings at step 724. The updated purchase summary is created and available for display to the subscriber at step 726.

Figure 8:
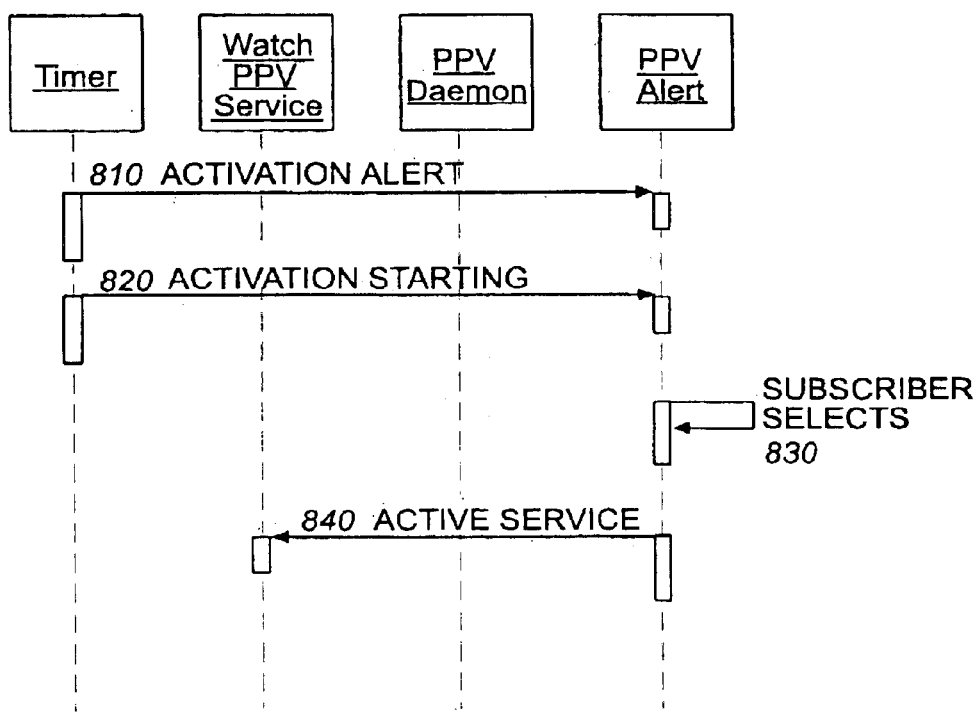
FIG. 8 illustrates a method for notifying a subscriber of a PPV event.

FIG. 8 illustrates a method for notifying a subscriber of a pending PPV event. If a subscriber has purchased a PPV event and is tuned to another channel, a PPV service can notify the subscriber that the PPV event will be starting soon and when the PPV event is actually starting. At step 810, Tthe timer program module alerts the subscriber, through a PPV alert function, just before the start of a PPV event. This alert is coordinated with the Watch PPV application and a PPV application server interface (a PPV Daemon application). The alert can be one minute or several minutes before the start of the PPV event. At step 820, the timer program module also alerts the subscriber of the start of the PPV event, again coordinated with the Watch PPV and PPV Daemon applications. At step 830, the subscriber selects the PPV event from the PPV alert function. When the subscriber selects the PPV event at step 830, the subscriber's can be automatically tuned to the PPV channel to watch the PPV event. At step 840, the PPV alert program module then communicates the activation of the service for the selected PPV event with the Watch PPV application.

Figure 9:
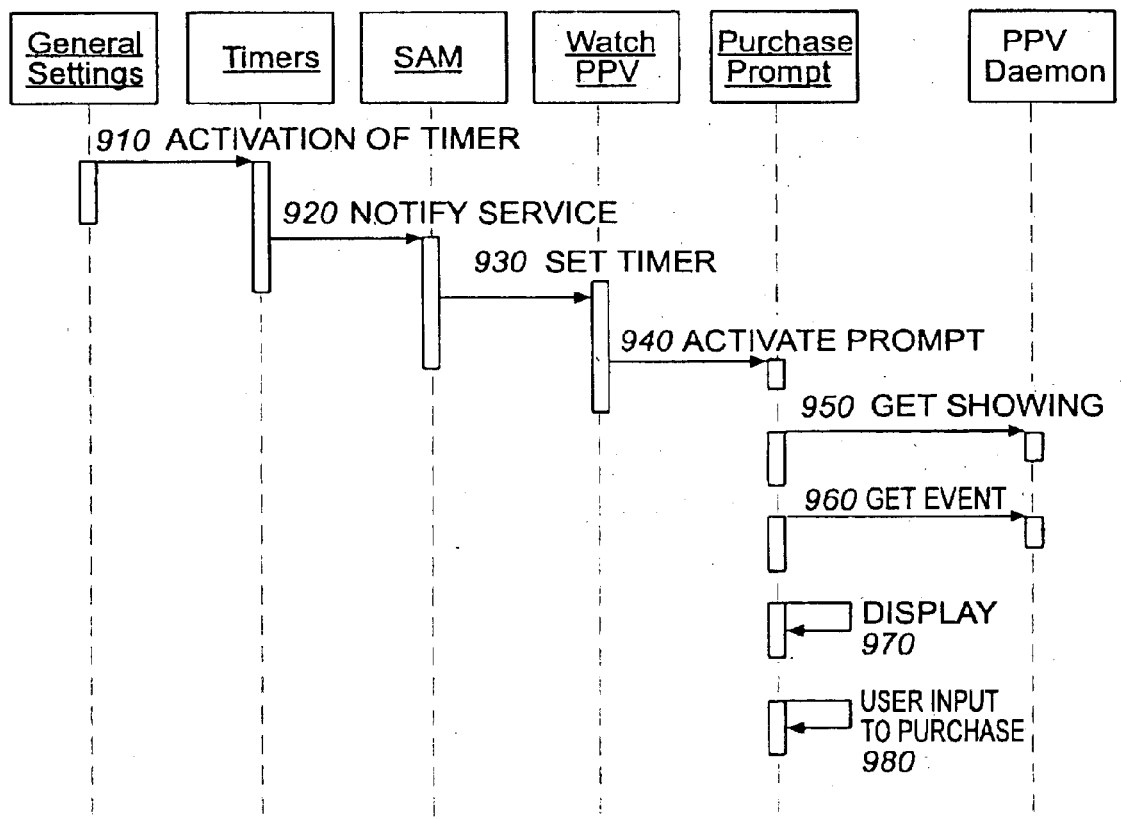
FIG. 9 illustrates a method for prompting a subscriber to purchase a PPV event.

FIG. 9 illustrates a method for prompting a subscriber to purchase a PPV event. As the start time of a PPV event approaches activation based on the general settings of the PPV system activates the timer program module of the PPV event (step 910). At step 920, the timer program module notifies an application coordination program module of the upcoming PPV event. The application coordination function, such as a SAM application, provides a communication means between multiple applications associated with the PPV services such as the Watch PPV application and the Server interface PPV Daemon application. At step 930, the Sam notifies the Watch PPV application of the timer program module notice. At step 940, the Watch PPV application activates a purchase prompt program module. In steps 950 and 960 the purchase prompt program module gets information about the upcoming PPV event from the PPV server via the PPV Daemon. The responses from the PPV Daemon are not shown in this illustration. The purchase prompt program module verifies and blocks the PPV event if it has already been purchased or if there is some other reason that the PPV event can not be purchased, such as parental blocking. Otherwise the purchase prompt program module displays the purchase prompt with the PPV event information at step 970. At step 980, the subscriber cancels the prompt or buys the PPV event. If the subscriber purchases the PPV event, the method of FIG. 6 is used, starting at step 624.

Figure 10:
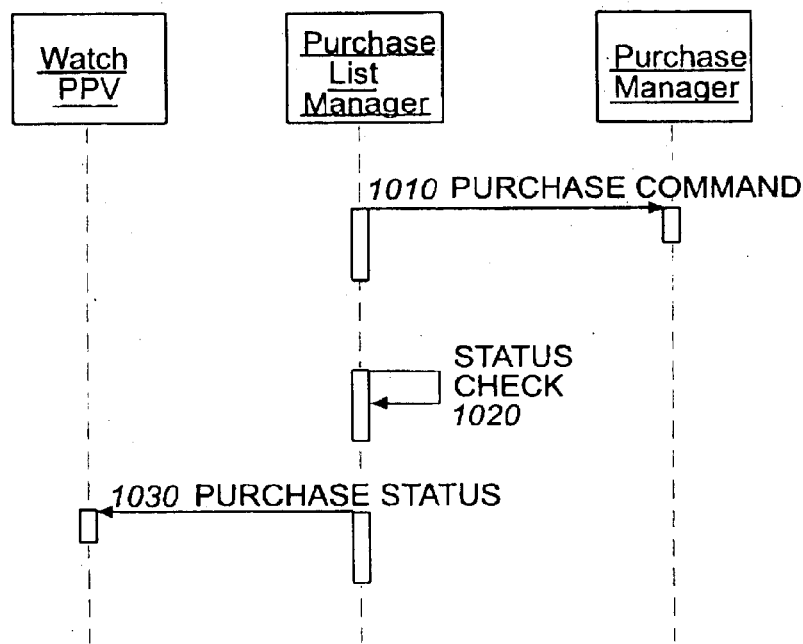
FIG. 10 illustrates a method for a secure purchase of a PPV event.

FIG. 10 illustrates a method for a secure purchase of a PPV event. Subscriber television systems typically do not want a PPV service to be authorized until just before the start of the PPV event to avoid the possibility of the PPV event being pirated by unauthorized users. To prevent this, a limited purchase window restricts secure purchases and authorization of a PPV event to a few minutes before and after the start of a PPV event. The encryption of a PPV event in the headend 110 requires the authorization and proper instructions or keys to decode the PPV event in the HCT 155. The authorization and downloading of the keys is required to view the PPV event. The advanced purchase of a PPV event is actually stored until the purchase window allows the secure purchase of the PPV event. Once the purchase window is open, the purchase list manager issues a purchase command to the purchase manager at step 1010, thereby actually purchasing and getting authorization for the PPV event. The purchase list manager performs a status check on the PPV event purchase at step 1020. The purchase list manager communicates the status to the Watch PPV application at step 1030.

CONCLUSION

From the foregoing, it will be appreciated that the present invention includes a method of providing a single multipurpose PPV subscriber channel in a subscriber television system. The present invention allows several different types of PPV services, each represented by a single multipurpose subscriber channel for the specific type of service (e.g., a family orientated PPV channel, an action movie PPV channel, a sports orientated PPV channel, etc.). Each single channel could include PPV events, advertising, previews, and a PPV guide associated with that PPV channel and its type of programming or service. While the described embodiment of the invention includes a single, multipurpose PPV channel, the present invention may be used to provide multiple PPV subscriber channels, each with a single PPV service, and a separate subscriber channel for the PPV guide. The advertising on each PPV channel displayed to subscribers not purchasing the PPV event of that service would include video and an interstitial service as described in the foregoing discussion.

The present invention describes the advertising with video during the display time of a PPV event, such that subscribers not purchasing the PPV event can see previews and advertising associated with the PPV service. Advertising or previews can be provided as an interstitial service during the interstitial period between the PPV event advertising windows. This interstitial service can also include video. Additionally, while the advertising has been described as PPV event related or as part of the interstitial service, the present invention is not so limited. The advertising during the event advertising windows is not limited to the event-related advertising. The advertising and associated previews can be related to a variety of other things, such as an item associated with the position of a cursor in a PPV program list, the theme of the PPV service, future events, or products and services that are not related to the PPV service.

Those skilled in the art will appreciate that various program modules can be included or excluded from the described system without effecting the present invention. For example the described system would support multiple types of PPV guides and will also function without a PPV guide.

The present invention describes a method of accessing the PPV event information. Those skilled in the art will appreciate that minor changes in the content of a described file type will be apparent to those skilled in the art to which the present invention pertains without departing from its spirit or scope.

The present invention describes providing a PPV referral. Those skilled in the art will appreciate that the PPV referral can be employed in conjunction with and independently from other aspects of the present invention. For example, in a PPV system with multiple PPV channels, a PPV referral banner or barker could be displayed on each PPV channel after the purchase window closes referring to the next showing of the current PPV event for that channel.

The present invention has been described in relation to particular embodiments, which are intended in all respects to be illustrative rather than restrictive. For example, although the present invention has been described in the context of a Watch PPV application, other multipurpose program modules, or combinations of program modules would also be capable supporting the methods and apparatus of the present invention.

In conclusion, while exemplary embodiments of the invention have been illustrated and described, it will be clear that the invention is not so limited. Alternative embodiments will be apparent to those skilled in the art to which the present invention pertains without departing from its spirit or scope. Accordingly the appended claims rather than the foregoing description define the scope of the present invention.

What is claimed is:

1. In a subscriber television system that provides pay-per-view services, a method for causing to be displayed to any system subscriber trying to purchase a pay-per-view event a referral for a next showing of the pay-per-view event when a purchase window for a current showing of the pay-per-view event is closed, the method comprising the steps of:

identifying when the purchase window for the current showing of the pay-per-view event closes; and responsive to the purchase window for the current pay-per-view event being closed further including the steps of:

displaying in a first window that the current pay-per-view event cannot be purchased;

providing in the first window a user prompt for a referral window; and responsive to the user responding to the user prompt, further including the steps of:

scanning a pay-per-view database for information associated with the next showing of the pay-per-view event; and displaying in the referral window the information associated with the next showing of the pay-per-view event to any system subscriber trying to purchase the current pay-per-view event.

2. The method of claim 1, further comprising the step of causing to be displayed a purchase option for the next showing of the pay-per-view event.

3. The method of claim 1, wherein the information associated with the next showing of the pay-per-view event is chosen from a group of information consisting of a next show time of the pay-per-view event, a next show date of the pay-per-view event, and a channel number of the next showing of the pay-per-view event.

4. The method of claim 1, wherein the display of the information associated with the next showing of the pay-per-view event is caused to be displayed in a pay-per-view referral window.

5. The method of claim 1, further including the following steps:

scanning the pay-per-view database for information associated with at least one showing of the pay-per-view event after the next showing of the pay-per-view event; and causing to be displayed the information associated with the at least one showing of the pay-per-view event, after the next showing of the pay-per-view event, to any system subscriber trying to purchase the current pay-per-view event when the purchase window for the current pay-per-view event is closed.

6. In a subscriber television system that provides pay-per-view services, a method for providing information related to a pay-per-view event, the method comprising the steps of:

defining a first temporal purchase window for a current showing of a pay-per-view event and a second temporal purchase window for a next showing of the pay-per-view event, wherein each temporal window is either open or closed;

responsive to the first temporal window being closed, further including the steps of:

displaying information associated with the next showing of the pay-per-view event;

receiving subscriber input for purchasing the next showing of the pay-per-view event;

responsive to the second temporal window being closed, storing the subscriber input; and responsive to the second temporal window being open, purchasing the next showing of the pay-per-view event.

7. The method of claim 6, further including the steps of:

determining whether the second temporal window is closed;

responsive to determining the second window is closed, initiating a timer for when the second window is open, and wherein the next showing of the pay-per-view event is purchased after the second window is opened.

8. The method of claim 6, further including the step of:

providing the subscriber with a purchase option for the next showing of the pay-per-view event.

* * * * *